(12) United States Patent
Wang et al.

(10) Patent No.: US 11,195,284 B2
(45) Date of Patent: Dec. 7, 2021

(54) TARGET OBJECT TRACKING METHOD AND APPARATUS, AND STORAGE MEDIUM

(71) Applicant: Shenzhen Sensetime Technology Co., Ltd., Shenzhen (CN)

(72) Inventors: Jing Wang, Shenzhen (CN); Guangcheng Zhang, Shenzhen (CN); Weilin Li, Shenzhen (CN); Bin Zhu, Shenzhen (CN)

(73) Assignee: Shenzhen Sensetime Technology Co., Ltd., Shenzhen (CN)

( * ) Notice: Subject to any disclaimer, the term of this patent is extended or adjusted under 35 U.S.C. 154(b) by 0 days.

(21) Appl. No.: 16/913,768

(22) Filed: Jun. 26, 2020

(65) Prior Publication Data

US 2020/0327678 A1 Oct. 15, 2020

Related U.S. Application Data

(63) Continuation of application No. PCT/CN2019/087261, filed on May 16, 2019.

(30) Foreign Application Priority Data

Jun. 1, 2018 (CN) .......................... 201810558523.6

(51) Int. Cl.
*G06T 7/20* (2017.01)
*G06T 7/70* (2017.01)
*G06K 9/62* (2006.01)

(52) U.S. Cl.
CPC ................ *G06T 7/20* (2013.01); *G06K 9/627* (2013.01); *G06T 7/70* (2017.01); *G06T 2207/30241* (2013.01)

(58) Field of Classification Search
CPC .............. G06T 7/20; G06T 7/70; G06K 9/627
See application file for complete search history.

(56) References Cited

U.S. PATENT DOCUMENTS

| 2012/0166080 A1 | 6/2012 | Hung et al. |
| 2013/0034266 A1* | 2/2013 | Shamir .................. G06T 7/292 |
| | | 382/103 |

(Continued)

FOREIGN PATENT DOCUMENTS

| CN | 102843547 | 12/2012 |
| CN | 105138954 | 12/2015 |

(Continued)

OTHER PUBLICATIONS

WIPO, International Search Report and Written Opinion dated Aug. 15, 2019, in PCT/CN2019/087261, 4 pgs.

(Continued)

*Primary Examiner* — Md K Talukder
(74) *Attorney, Agent, or Firm* — Henry Patent Law Firm PLLC

(57) ABSTRACT

The present disclosure relates to a target object tracking method and apparatus, an electronic device, and a storage medium. The method includes: obtaining a first reference image of a target object; determining time information and location information of the target object in an image to be analyzed according to the first reference image, the image to be analyzed including the time information and the location information; determining a trajectory of the target object according to the time information and the location information of the target object; and generating tracking information for tracking the target object according to the trajectory of the target object. Embodiments of the present disclosure obtain highly-accurate tracking information of the target object according to the trajectory of the target object determined in the image to be analyzed by using the first reference image of the target object, such that the success rate of target object tracking is improved.

20 Claims, 7 Drawing Sheets

(56) References Cited

U.S. PATENT DOCUMENTS

| | | | | |
|---|---|---|---|---|
| 2013/0307974 | A1* | 11/2013 | Kawano | G06K 9/00771 |
| | | | | 348/143 |
| 2013/0329958 | A1 | 12/2013 | Oami et al. | |
| 2016/0140391 | A1* | 5/2016 | Kim | H04N 5/232 |
| | | | | 382/103 |
| 2016/0373661 | A1* | 12/2016 | Zhang | G01S 3/7864 |
| 2017/0248971 | A1* | 8/2017 | Wei | G05D 1/0094 |
| 2018/0158197 | A1* | 6/2018 | Dasgupta | G06K 9/726 |
| 2019/0066334 | A1* | 2/2019 | Gu | G06T 7/80 |
| 2020/0242780 | A1* | 7/2020 | Magai | G06T 7/238 |
| 2020/0327678 | A1* | 10/2020 | Wang | G06K 9/627 |
| 2020/0374492 | A1* | 11/2020 | Wu | H04N 5/247 |
| 2020/0401857 | A1* | 12/2020 | Lu | G06K 9/00295 |

FOREIGN PATENT DOCUMENTS

| | | |
|---|---|---|
| CN | 105205155 | 12/2015 |
| CN | 105354548 | 2/2016 |
| CN | 105404890 | 3/2016 |
| CN | 106056110 | 10/2016 |
| CN | 106203458 | 12/2016 |
| CN | 106650652 | 5/2017 |
| CN | 107665495 | 2/2018 |
| CN | 108052882 | 5/2018 |
| CN | 108897777 | 11/2018 |
| JP | 2006236225 | 9/2006 |
| JP | 2011180684 | 9/2011 |
| WO | 2019228194 | 12/2019 |

OTHER PUBLICATIONS

CNIPA, Second Office Action CN 201810558523.6, dated May 11, 2021, with translation, 22 pgs.

JPO, Notice of Reasons for Refusal JP 2020554360, dated Aug. 31, 2021, with translation, 9 pgs.

Sun, Xue, "Design and Implementation of Target Face Query System for Video", A Thesis in Electronics and Communication Engineering, Northeastern University, May 2013, 72 pgs.

* cited by examiner

TARGET OBJECT TRACKING METHOD AND APPARATUS, AND STORAGE MEDIUM

CROSS-REFERENCE TO RELATED APPLICATIONS

The present application is a continuation of and claims priority under 35 U.S.C. §120 to International Application No. PCT/CN2019/087261, filed May 16, 2019, which claims priority to Chinese Patent Application No. 201810558523.6, filed with the Chinese Patent Office on Jun. 1, 2018 and entitled "TARGET OBJECT TRACKING METHOD AND APPARATUS, ELECTRONIC DEVICE, AND STORAGE MEDIUM". All above-referenced priority documents are incorporated herein by reference in their entirety.

TECHNICAL FIELD

The present disclosure relates to the field of security technologies, and in particular, to a target object tracking method and apparatus, an electronic device, and a storage medium.

BACKGROUND

With the development of information technologies, there are also more requirements on tracking information for tracking target objects. For example, in security management departments such as a public security department, the catch success rate can be improved by arranging personnel to monitor a suspect using the tracking information.

SUMMARY

In this regard, the present disclosure provides a technical solution for target object tracking.

According to one aspect of the present disclosure, provided is a target object tracking method, including: obtaining a first reference image of a target object; determining time information and location information of the target object in an image to be analyzed according to the first reference image, the image to be analyzed including the time information and the location information; determining a trajectory of the target object according to the time information and the location information of the target object; and generating tracking information for tracking the target object according to the trajectory of the target object.

In a possible implementation, after obtaining the first reference image of the target object, the method further includes: determining identification information of the target object; and the generating tracking information for tracking the target object according to the trajectory of the target object includes generating tracking information for tracking the target object according to the trajectory of the target object and the identification information of the target object.

In a possible implementation, the determining identification information of the target object includes: detecting the target object in an identification image library according to the first reference image of the target object, identification images in the identification image library including identification information of objects; and determining the identification information of the target object according to the target object detected in the identification image library.

In a possible implementation, the determining identification information of the target object further includes: when it is unable to detect the target object in the identification image library according to the first reference image of the target object, determining a second reference image of the target object in the image to be analyzed, the definition of the second reference image being greater than that of the first reference image; detecting the target object in the identification image library according to the second reference image of the target object; and determining the identification information of the target object according to the target object detected in the identification image library.

In a possible implementation, the method further includes: determining an association object of the target object in the image to be analyzed, and determining a trajectory of the association object; and the generating tracking information for tracking the target object according to the trajectory of the target object includes generating the tracking information for tracking the target object according to the trajectory of the target object and the trajectory of the association object.

In a possible implementation, the determining an association object of the target object in the image to be analyzed includes: determining in the image to be analyzed a target image including the target object; and determining the association object of the target object in the target image.

In a possible implementation, the determining an association object of the target object in the target image includes: determining an object to be associated of the target object in the target image; detecting the object to be associated in the image to be analyzed; determining time information and location information of the object to be associated in the image to be analyzed according to the detected object to be associated; determining a trajectory of the object to be associated according to the time information and the location information of the object to be associated; and when the degree of coincidence between the trajectory of the object to be associated and the trajectory of the target object is greater than a degree-of-coincidence threshold, determining the object to be associated as the association object of the target object.

According to one aspect of the present disclosure, provided is a target object tracking apparatus, including: a first reference image obtaining module configured to obtain a first reference image of a target object; an information determining module configured to determine time information and location information of the target object in an image to be analyzed according to the first reference image, the image to be analyzed including the time information and the location information; a trajectory determining module configured to determine a trajectory of the target object according to the time information and the location information of the target object; and a tracking information generating module configured to generate tracking information for tracking the target object according to the trajectory of the target object.

In a possible implementation, the apparatus further includes: a first identification information determining sub-module configured to determine identification information of the target object; and the tracking information generating module includes: a first tracking information generating sub-module configured to generate tracking information for tracking the target object according to the trajectory of the target object and the identification information of the target object.

In a possible implementation, the first identification information determining module includes: a first detecting sub-module configured to detect the target object in an identification image library according to the first reference image of the target object, identification images in the identification image library including identification information of objects; and a first identification information determining sub-module configured to determine the identification information of the target object according to the target object detected in the identification image library.

In a possible implementation, the first identification information determining module further includes: a second reference image obtaining sub-module configured to, when it is unable to detect the target object in the identification image library according to the first reference image of the target object, determine a second reference image of the target object in the image to be analyzed, the definition of the second reference image being greater than that of the first reference image; a second detecting sub-module configured to detect the target object in the identification image library according to the second reference image of the target object; and a second identification information determining sub-module configured to determine the identification information of the target object according to the target object detected in the identification image library.

In a possible implementation, the apparatus further includes: an association object determining module configured to determine an association object of the target object in the image to be analyzed; an association object trajectory determining module configured to determine a trajectory of the association object; and the tracking information generating module includes: a second tracking information generating sub-module configured to generate tracking information for tracking the target object according to the trajectory of the target object and the trajectory of the association object.

In a possible implementation, the association object determining module includes: a target image determining sub-module configured to determine in the image to be analyzed a target image including the target object; and a first association object determining sub-module configured to determine the association object of the target object in the target image.

In a possible implementation, the first association object determining sub-module includes: an object to be associated determining unit configured to determine an object to be associated of the target object in the target image; an object to be associated detecting unit configured to detect the object to be associated in the image to be analyzed; an object to be associated information determining unit configured to determine time information and location information of the object to be associated in the image to be analyzed according to the detected object to be associated; an object to be associated trajectory determining unit configured to determine a trajectory of the object to be associated according to the time information and the location information of the object to be associated; and a second association object determining unit configured to, when the degree of coincidence between the trajectory of the object to be associated and the trajectory of the target object is greater than a degree-of-coincidence threshold, determine the object to be associated as the association object of the target object.

According to one aspect of the present disclosure, provided is an electronic device, including: a processor; and a memory configured to store processor-executable instructions; where the processor is configured to execute the target object tracking method.

According to one aspect of the present disclosure, provided is a computer-readable storage medium, having computer program instructions stored thereon, where when the computer program instructions are executed by a processor, the target object tracking method is implemented.

According to one aspect of the present disclosure, provided is a computer program, including a computer-readable code, where when the computer-readable code runs in an electronic device, a processor in the electronic device executes the target object tracking method.

In embodiments of the present disclosure, the time information and the location information of the target object can be determined in the image to be analyzed using the first reference image of the target object. After determining the trajectory of the target object according to the time information and the location information of the target object, the tracking information for tracking the target object is generated according to the trajectory of the target object. Highly-accurate tracking information of the target object is obtained according to the trajectory of the target object determined in the image to be analyzed by using the first reference image of the target object, such that the success rate of target object tracking is improved.

Exemplary embodiments are described in detail below with reference to the accompanying drawings, and other features and aspects of the present disclosure become clear.

BRIEF DESCRIPTION OF THE DRAWINGS

Accompanying drawings included in the specification and constructing a part of the specification jointly show the exemplary embodiments, characteristics, and aspects of the present disclosure, and are intended to explain the principles of the present disclosure.

DETAILED DESCRIPTION

The following will describe various exemplary embodiments, features, and aspects of the present disclosure in detail with reference to the accompanying drawings. Like accompanying symbols in the accompanying drawings represent elements with like or similar functions. Although various aspects of the embodiments are illustrated in the accompanying drawing, the accompanying drawings are not necessarily drawn in proportion unless otherwise specified.

The special term "exemplary" here means "used as an example, an embodiment, or an illustration". Any embodiment described as "exemplary" here is not necessarily to be interpreted as superior to or better than other embodiments.

In addition, for better illustration of the present disclosure, various specific details are given in the following specific implementations. A person skilled in the art should understand that the present disclosure may also be implemented without some specific details. In some examples, methods, means, elements, and circuits well known to a person skilled in the art are not described in detail so as to highlight the subject matter of the present disclosure.

Figure 1:
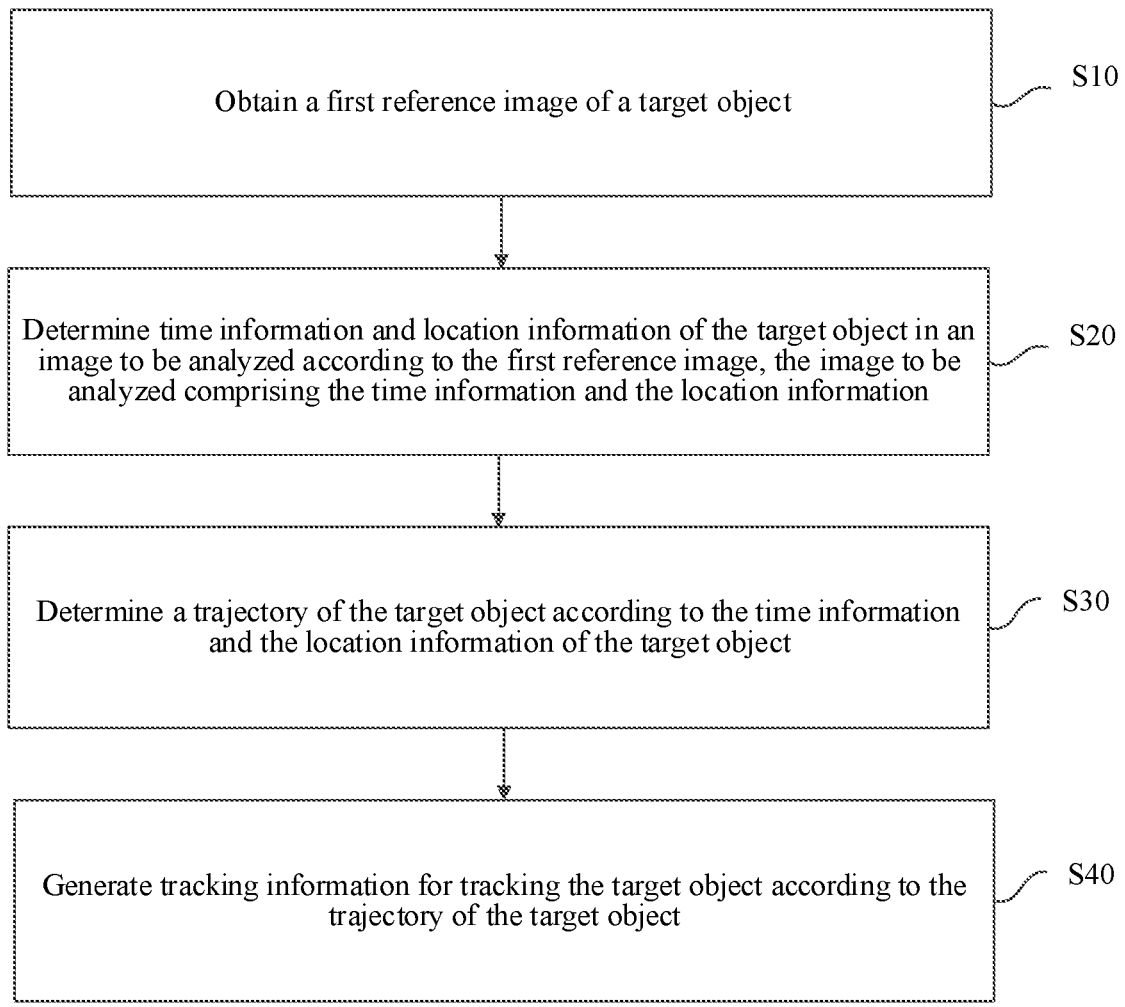
FIG. 1 is a flowchart of a target object tracking method according to an exemplary embodiment.

FIG. 1 is a flowchart of a target object tracking method according to an exemplary embodiment. As shown in FIG. 1, the target object tracking method includes:

at step S10, a first reference image of a target object is obtained.

In a possible implementation, the target object may include various types of objects such as a human, an animal, a plant, and a building. There may be one or more target objects. The target object may be one type of object and may also be a combination of various types of objects.

The first reference image of the target object may include a photo, a portrait, or the like of the target object. The first reference image may be a static image, and may also be an image frame in a video stream. The first reference image may merely include an image of the target object, and may also include images of other objects. The first reference image may include one image of the target object, and may also include a plurality of images of the target object.

At step S20, time information and location information of the target object are determined in an image to be analyzed according to the first reference image, the image to be analyzed including the time information and the location information.

In a possible implementation, the image to be analyzed includes an original captured image. For example, the image to be analyzed is an image captured by a surveillance camera. The image to be analyzed may include a plurality of objects, and may also include a single object. For example, if a surveillance image captured by a surveillance camera in a crowded place is determined as an image to be analyzed, captured surveillance image A includes a plurality of objects.

The image to be analyzed may also include an image cropped from the original captured image. For example, after performing face recognition on an original image captured by the surveillance camera, detection results of objects in the original image, for example, detection boxes of the objects, are obtained. After cropping corresponding images in the original image according to the detection results of the objects, images to be analyzed of the objects are obtained. For example, surveillance image B captured by a surveillance camera in an Internet café includes three objects, i.e., person 1, person 2, and person 3. Detection boxes of the three objects are detected in the surveillance image B using a face recognition technology. Corresponding images are cropped in the surveillance image B according to the three detection boxes to obtain image to be analyzed 1 of the person 1, image to be analyzed 2 of the person 2, and image to be analyzed 3 of the person 3. In this case, each image to be analyzed merely includes one object.

The time information of the image to be analyzed includes the time at which the image to be analyzed is captured. The location information of the image to be analyzed includes the location at which the image to be analyzed is captured. For example, if the image to be analyzed is a surveillance image captured by a surveillance camera, the time information of the image to be analyzed is determined according to the time at which the surveillance image is captured, and the location information of the image to be analyzed is determined according to the location at which the camera is mounted. The location information includes longitude and latitude information and postal address information.

The detection result of the target object may be obtained by performing target object detection on the first reference image. The target object may be obtained by detecting the first reference image using an image recognition technology. The target object may also be obtained by inputting the first reference image to a corresponding neural network, and detecting the image to be analyzed according to the output result of the neural network.

Target object detection is performed in the image to be analyzed according to the target object detected in the first reference image. When the target object is detected in the image to be analyzed, the time information and the location information of the target object are obtained according to the time information and the location information of the image to be analyzed where the detected target object is located.

There may be a plurality of images to be analyzed, and therefore, a plurality of time information and location information of the target object can be obtained.

At step S30, a trajectory of the target object is determined according to the time information and the location information of the target object.

In a possible implementation, the time information and the location information of the target object have one-to-one correspondence. The trajectory of the target object may be obtained by associating the location information in a time sequence of the time information of the target object. For example, a list-type trajectory of the target object is obtained.

A linear trajectory of the target object may also be obtained by marking the time information and the location information of the target object on a map and sequentially connecting the marks on the map in a time sequence according to the marked location information and time information. The linear trajectory of the target object on the map is more intuitive.

When there is merely one pair of time information and location information of the target object, the trajectory of the target object is a location corresponding to one time point.

At step S40, tracking information for tracking the target object is generated according to the trajectory of the target object.

In a possible implementation, the activity law or the time and/or location at which the target object frequently appears is determined according to the trajectory of the target object, the time and location at which the target object may appear is predicted, and the tracking information for tracking the target object is generated according to the prediction result. For example, a security management department determines according to a trajectory of a suspect a time and a location at which a suspect frequently appears, predicts according to the trajectory of the suspect a time and a location at which the suspect may appear, and generates tracking information for the suspect according to the prediction result, such that the suspect tracking success rate can be improved.

In this embodiment, the time information and the location information of the target object can be determined in the image to be analyzed using the first reference image of the target object. After determining the trajectory of the target object according to the time information and the location information of the target object, the tracking information for tracking the target object is generated according to the trajectory of the target object. Highly-accurate tracking information of the target object is obtained according to the trajectory of the target object determined in the image to be analyzed by using the first reference image of the target object, such that the success rate of target object tracking is improved.

Figure 2:
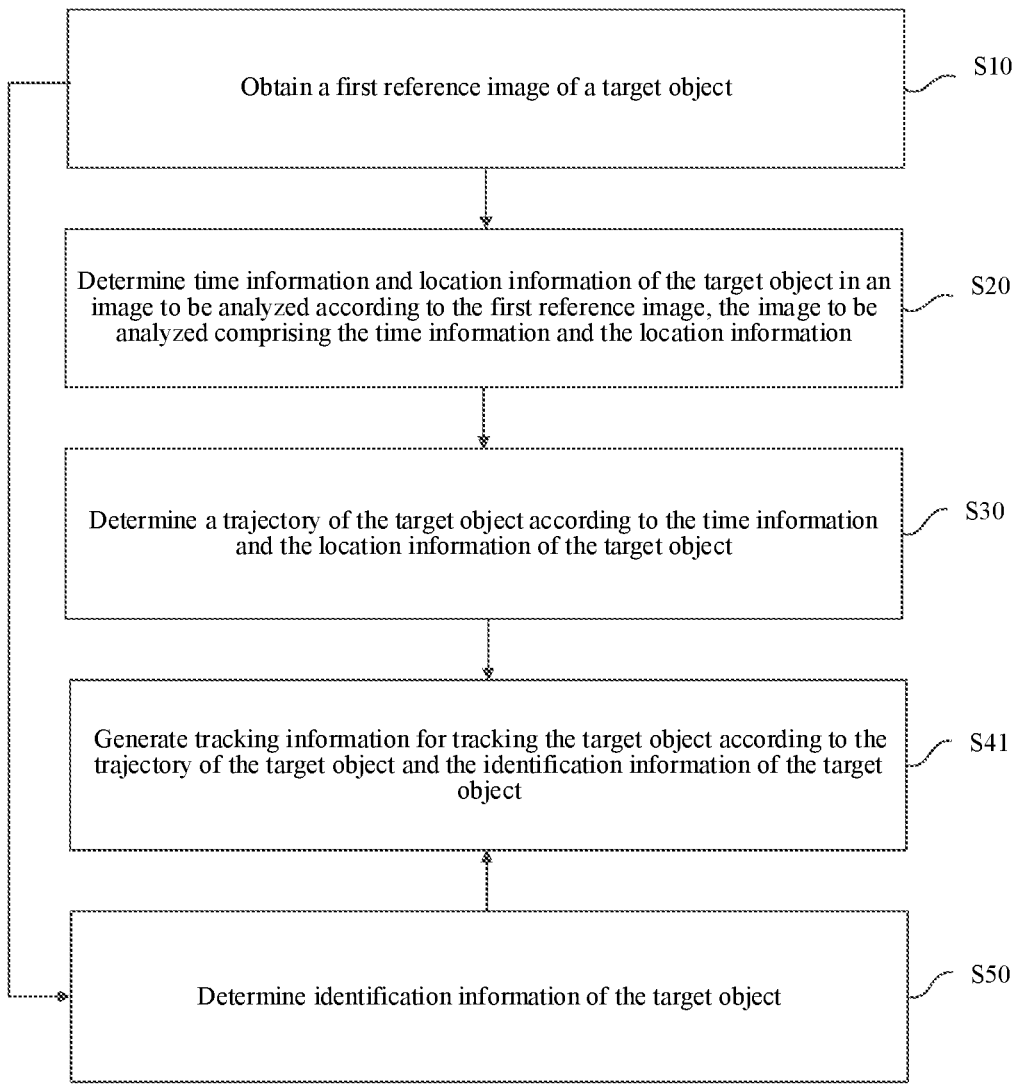
FIG. 2 is a flowchart of a target object tracking method according to an exemplary embodiment.

FIG. 2 is a flowchart of a target object tracking method according to an exemplary embodiment. As shown in FIG. 2, after step S10, the target object tracking method further includes:

at S50, identification information of the target object is determined.

In a possible implementation, the identification information of the target information includes information such as the name, attribute, and feature of the target object. The target object is distinguished from other objects using the identification information. More comprehensive information of the target object is obtained using the identification information.

For example, if the target object is a human, the identification information includes identity card information, criminal record information, social relation information and the like of the target object.

A plurality of identification information libraries can be created according to requirements. A corresponding identification information library can be found according to requirements. Identification information of a preset target object may be obtained according to requirements. Preset identification information of the target object may also be obtained according to requirements. For example, if the target object is a human, an identity card information library is created. Identity card information of a suspect that falls within the age range of 20-40 years old may be obtained according to requirements. Address information of the suspect that falls within the age range of 20-40 years old may also be obtained.

Step S40 includes:

at step S41, tracking information for tracking the target object is generated according to the trajectory of the target object and the identification information of the target object.

In a possible implementation, the tracking information is obtained according to the combination of the trajectory of the target object and the identification information of the target object. For example, features such as the age, height, and weight of the target object is determined according to the identification information of the target object, and the generated tracking information carry the features such as the age, height, and weight of the target object to facilitate obtaining more comprehensive information of the target object by a user of the tracking information.

In this embodiment, the identification information of the target object is determined, and the tracking information for tracking the target object is generated according to the trajectory and the identification information of the target object. More comprehensive and accurate tracking information can be obtained using the identification information. When the generated tracking information is used for tracking the target object, the identification information can improve the target object tracking success rate.

Figure 3:
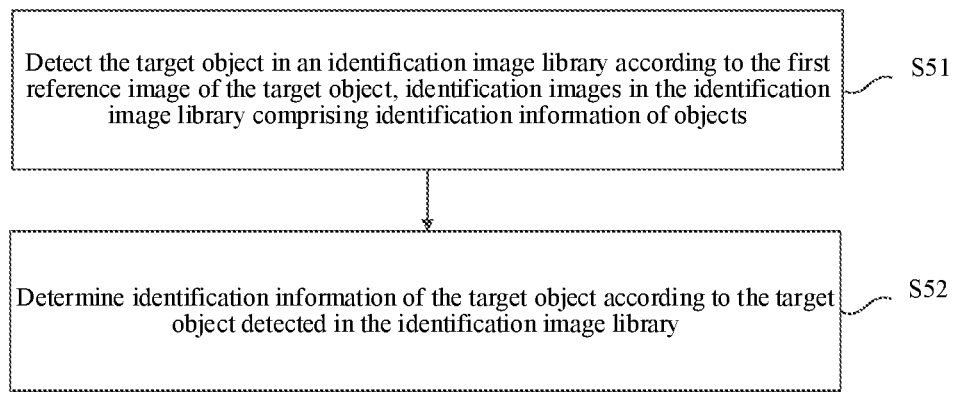
FIG. 3 is a flowchart of step S50 of a target object tracking method according to an exemplary embodiment.

FIG. 3 is a flowchart of step S50 of a target object tracking method according to an exemplary embodiment. As shown in FIG. 3, the step S50 of the target object tracking method includes:

at S51, the target object is detected in an identification image library according to the first reference image of the target object, identification images in the identification image library including identification information of objects.

In a possible implementation, the identification image library includes identification images of a plurality of target objects, and the identification images include identification information of the target objects. According to requirements, an identification image library can be created for objects satisfying a set condition. For example, an identification image library may be created for objects having criminal records. An identification image library for objects satisfying a set identification range may also be created. For example, identification image library for objects satisfying identification information such as a set range and a set sex can be created.

The target object is detected in the identification image in the identification image library according to the target object in the first reference image. The target object may be detected in the identification image library using technologies such as image recognition. The target object may also be obtained by inputting the first reference image of the target object to a neural network, and detecting target object according to the output result of the neural network.

For example, the identification image library includes an identity card information library. Identification images in the identity card information library may include photos on identity cards of persons, and the identification images may also include identity card information such as names, addresses, and ages of the identity cards of the persons. Suspect A is be detected in photos in the identity card information library according to photo 1 of the suspect A.

At step S52, identification information of the target object is determined according to the target object detected in the identification image library.

In a possible implementation, when the target object is detected in the identification image library, the identification image corresponding to the target object and the identification information corresponding to the target object are determined according to the detection result. For example, when the photo of the identity card of the suspect A is detected in the identity card information library, identification information on the identity card, such as the name, age, and address of the suspect A can be determined according to the detection result.

In this embodiment, the identification information of the target object can be determined in the identification image library according to the first reference image of the target object. The target object can be conveniently and accurately detected using the identification image library and the finally generated tracking information of the target object is more accurate.

Figure 4:
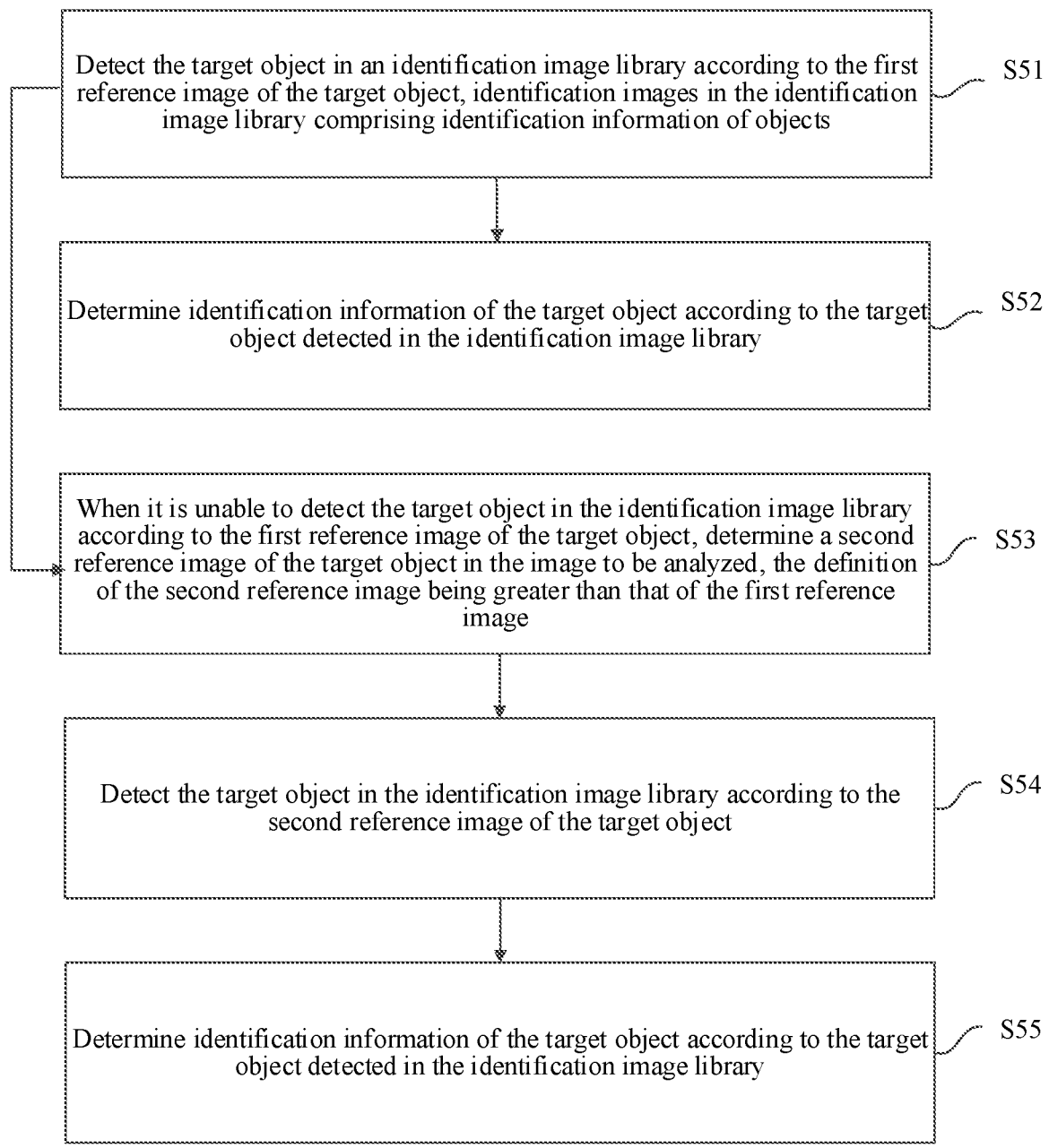
FIG. 4 is a flowchart of step S50 of a target object tracking method according to an exemplary embodiment.

FIG. 4 is a flowchart of step S50 of a target object tracking method according to an exemplary embodiment. As shown in FIG. 4, the step S50 of the target object tracking method includes:

at step S53, when it is unable to detect the target object in the identification image library according to the first reference image of the target object, a second reference image of the target object is determined in the image to be analyzed, the definition of the second reference image being greater than that of the first reference image.

In a possible implementation, different capturing angles and capturing environments may result in different definitions and included features of the target object in the first reference image. If the target object in the first reference image has a poor definition or an incomplete feature, the target object may not be detected in the identification image library.

when it is unable to detect the target object in the identification image library according to the first reference image, a second reference image of the target object is determined in the image to be analyzed, the definition of the second reference image being greater than that of the first reference image. An image to be analyzed library includes images of a plurality of candidate objects, and the target object can be determined in the image to be analyzed according to the similarity between the candidate objects in the image to be analyzed and the first reference image. Furthermore, the second reference image of the target object is determined in the image to be analyzed according to the determination result of the target object.

In a possible implementation, if the similarity between one candidate object in the image to be analyzed and the target object is greater than a similarity threshold, the candidate object is determined as the target object.

For example, photo 3 of suspect B has a poor definition because it is captured at night, and it is unable to detect the suspect B in the identification image library according to the photo 3. Image 4 of the suspect B is determined in the image to be analyzed library according to the photo 3 of the suspect B. The definition of the image 4 is greater than that of the photo 3. The suspect B in the image 4 is clearer, and/or the feature of the suspect B is more comprehensive.

At step S54, the target object is detected in the identification image library according to the second reference image of the target object.

In a possible implementation, the target object is continued to be detected in the identification image library according to the determined second reference image of the target object. For example, the suspect B is continued to be detected in the identification image library according to the image 4 of the suspect B. Because the definition of the second reference image is greater than that of the first reference image, the success rate that the target object is detected in the identification image library can be improved.

At step S55, identification information of the target object is determined according to the target object detected in the identification image library.

In a possible implementation, when the target object is detected in the identification image library according to the second reference image, the identification information of the target object can be obtained according to the detection result. For example, after the photo of the identity card of the suspect B is detected in the identity card information library according to the image 4 of the suspect B, the identification information on the identity card, such as the name, age, and address of the suspect B can be obtained.

In this embodiment, when it is unable to detect the target object in the identification image library according to the first reference image of the target object, the identification information of the target object can be obtained by determining in the image to be analyzed the second reference image of the target object and detecting the target object in the identification image library according to the second reference image. If the first reference image is not clear, the identification information of the target object is obtained according to the second reference image, thereby improving the success rate of obtaining the identification information of the target object.

Figure 5:
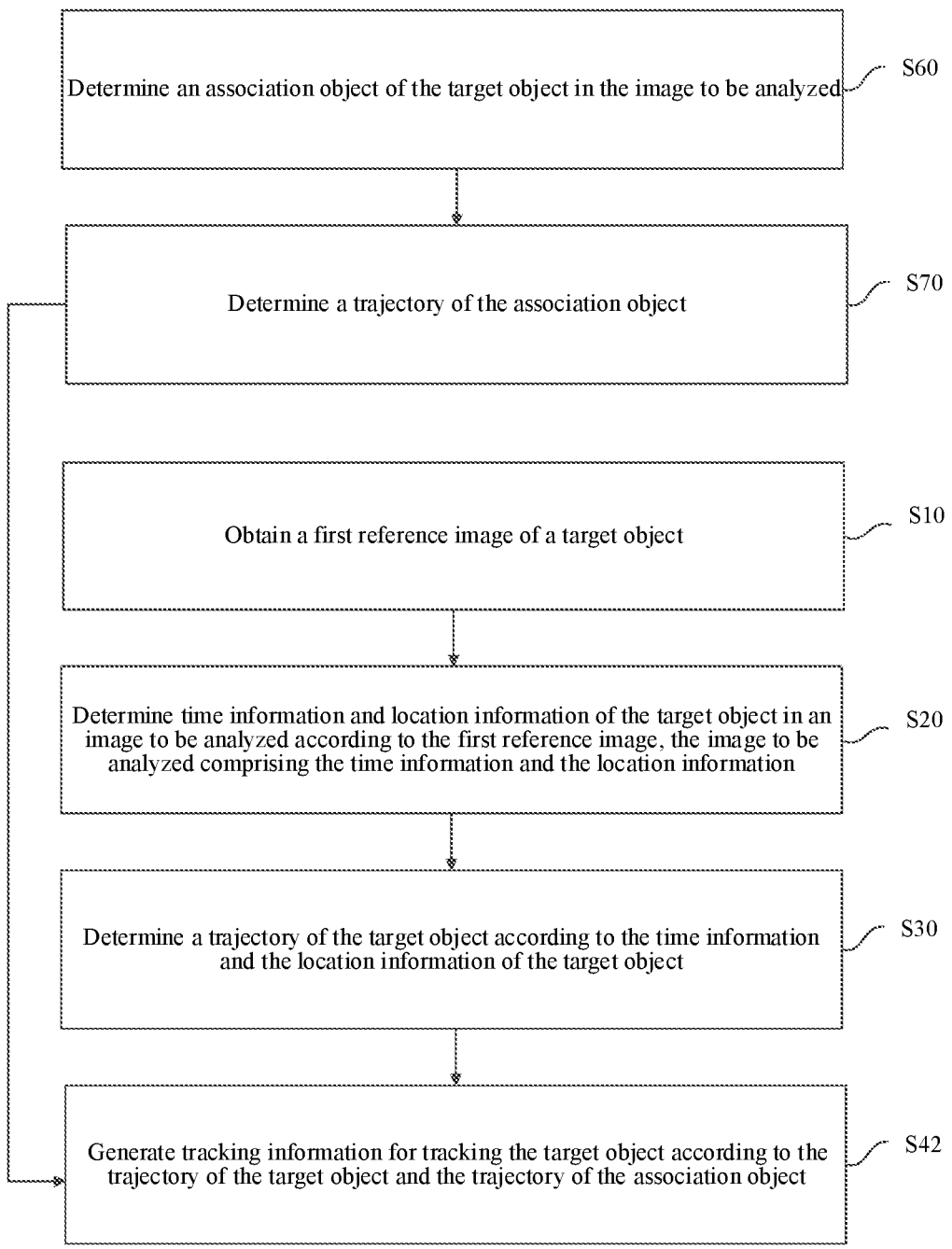
FIG. 5 is a flowchart of a target object tracking method according to an exemplary embodiment.

FIG. 5 is a flowchart of a target object tracking method according to an exemplary embodiment. As shown in FIG. 5, the target object tracking method further includes:

at step S60, an association object of the target object is determined in the image to be analyzed.

In a possible implementation, the association object of the target object may include an object that appears at the same location as the target object at a different time, and may also include an object that appears at the same location and the same time as the target object. For example, the association object may include an object that appears at location 1 and location 2 with the target object at different times, and may also include objects that appear at location 3 with the target object at three same times. The association object of the target object is determined according to requirements.

Candidate objects that appear at the same location as the target object can be detected in the image to be analyzed, and the association object is determined from the candidate objects according to a preset association object determination condition.

The target object has a plurality of association objects.

At step S70, a trajectory of the association object is determined.

In a possible implementation, time information and location information of the association object are determined in the image to be analyzed according to the image where the association object is located, and the trajectory of the association object is determined according to the time information and the location information of the association object. The determination process of the trajectory of the association object is similar to the generation process of the trajectory of the target object. Reference can be made to the generation process of the trajectory of the target object in the embodiment shown in FIG. 1.

Step S40 includes:

at step S42, the tracking information for tracking the target object is generated according to the trajectory of the target object and the trajectory of the association object.

In a possible implementation, in the case that there is a plenty of time information and location information of the target object in the trajectory of the target object, in order to track the target object in more targeted fashion, a cross trajectory of the target object and the association object is generated according to the trajectory of the target object and the association object, and the tracking information for tracking the target object is generated using the cross trajectory.

In the case that there is a little time information and location information of the target object in the trajectory of the target object, in order to generate more useful tracking information, the trajectory of the target object and the trajectory of the association object are combined to generate a combined trajectory, and the tracking information for tracking the target object is generated using the combined trajectory.

In this embodiment, the association object of the target object is determined in the image to be analyzed, and the tracking trajectory for tracking the target object is generated according to the trajectory of the association object and the trajectory of the target object. The trajectory of the target object can be supplemented or corrected using the trajectory of the association object, such that more accurate tracking information is generated.

Figure 6:
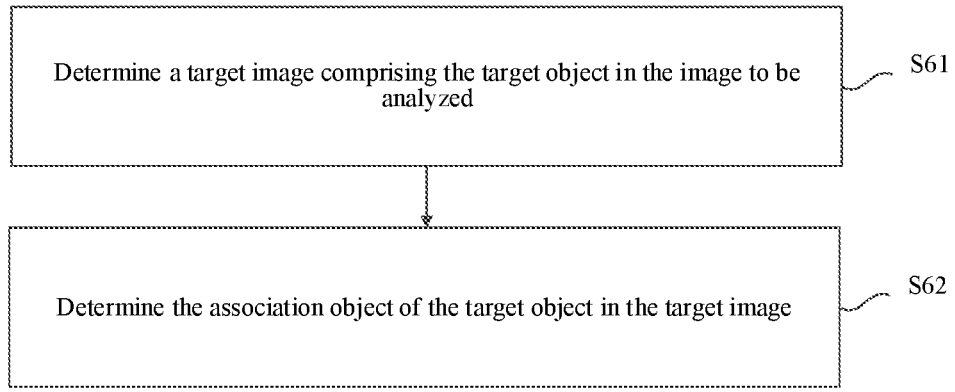
FIG. 6 is a flowchart of step S60 of a target object tracking method according to an exemplary embodiment.

FIG. 6 is a flowchart of step S60 of a target object tracking method according to an exemplary embodiment. As shown in FIG. 6, the step S60 of the target object tracking method includes:

at step S61, a target image including the target object is determined in the image to be analyzed; and At step S62, the association object of the target object is determined in the target image.

In a possible implementation, the target image including the target object is determined in the image to be analyzed. The target image is the image to be analyzed where the target object is located.

A plurality of target images of the target object is determined in the image to be analyzed. The target image includes one or more other objects other than the target object. The other objects included in each target image may be different. The association object can be determined in the target image on the basis of different association object selection conditions according to requirements. For example, the other objects appearing in the target image may all be determined as association objects. The other objects having the number of appearances greater than a threshold in each target object may also be determined as association objects.

For example, target object 1 has three target images, which are respectively target image 1, target image 2, and target image 3. In addition to the target object, the target image 1 further includes object A, object B, and object C. In addition to the target object, target object 2 further includes the object B, the object C, object D, and object E. In addition to the target object, target object 3 further includes the object A, the object C, the object D, and the object E. According to the association object selection condition that the number of appearances is greater than a threshold, the object C having the number of appearances greater than two may be determined as the association object of the target object. According to an association object selection condition appearing at a same location, all of the object A to the object E may also be determined as the association objects of the target object.

In this embodiment, the association object is determined in the target image after the target image of the target object is determined in the image to be analyzed. The association object can be conveniently and accurately determined using the target image.

In a possible implementation, the step S62 of the target object tracking method includes:
determining an object to be associated of the target object in the target image;
detecting the object to be associated in the image to be analyzed;
determining time information and location information of the object to be associated in the image to be analyzed according to the detected object to be associated;
determining a trajectory of the object to be associated according to the time information and the location information of the object to be associated; and
when the degree of coincidence between the trajectory of the object to be associated and the trajectory of the target object is greater than a degree-of-coincidence threshold, determining the object to be associated as the association object of the target object.

In a possible implementation, the object to be associated is determined in the target image according to requirements. For example, the other objects appearing in the target image of the target object are determined as objects to be associated.

Detection is performed in the image to be analyzed according to the object to be associated in the target image. The object to be associated may be recognized in the image to be analyzed using an image recognition technology. The object to be associated may also be obtained by inputting the object to be associated in the target image to a neural network and detecting the object to be associated in the image to be analyzed using the neural network. When the object to be associated is detected in the image to be analyzed, the time information and the location information of the object to be associated are determined according to the time information and the location information of the image to be analyzed including the object to be associated. A plurality of time information and location information of the object to be associated is determined.

A trajectory of the object to be associated is obtained according to the time information and the location information of the object to be associated. For example, the trajectory of the object to be associated may be obtained by associating the location information of the object to be associated in a time sequence. A linear trajectory of the object to be associated may also be obtained by marking the time information and the location information of the object to be associated on a map and linearly connecting the locations in a time sequence.

A degree-of-coincidence threshold is set according to requirements. If the degree of coincidence between the trajectory of the object to be associated and the trajectory of the target object is greater than the degree-of-coincidence threshold, the object to be associated is determined as the association object of the target object. The coincidence between the trajectory of the object to be associated and the trajectory of the target image includes the complete coincidence between the time information and the location information of the object to be associated, and may also include the coincidence in a set time range between the time information of the object to be associated and the time information of the target object, and/or the coincidence in a set geographical range between the location information of the object to be associated and the location information of the target object.

In this embodiment, the association object of the target object is determined according to the degree of coincidence between the trajectory of the object to be associated and the target object and the degree-of-coincidence threshold. The association object has a close association relation with the target object. The trajectory of the association object is also more valuable for the correction and supplementation of the generation of tracking information.

It can be understood that the foregoing method embodiments mentioned in the present disclosure are combined with each other to form a combined embodiment without departing from the principle and the logic. Details are not described in the present disclosure due to space limitation.

Figure 7:
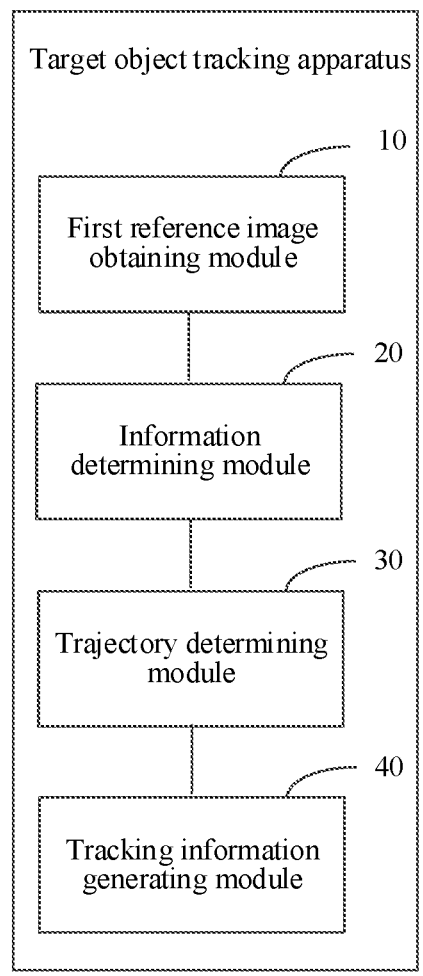
FIG. 7 is a flowchart of a target object tracking apparatus according to an exemplary embodiment.

FIG. 7 is a block diagram of a target object tracking apparatus according to an exemplary embodiment. As shown in FIG. 7, the target object tracking apparatus includes:
a first reference image obtaining module 10 configured to obtain a first reference image of a target object;
an information determining module 20 configured to determine time information and location information of the target object in an image to be analyzed according to the first reference image, the image to be analyzed comprising the time information and the location information;
a trajectory determining module 30 configured to determine a trajectory of the target object according to the time information and the location information of the target object; and
a tracking information generating module 40 configured to generate tracking information for tracking the target object according to the trajectory of the target object.

Figure 8:
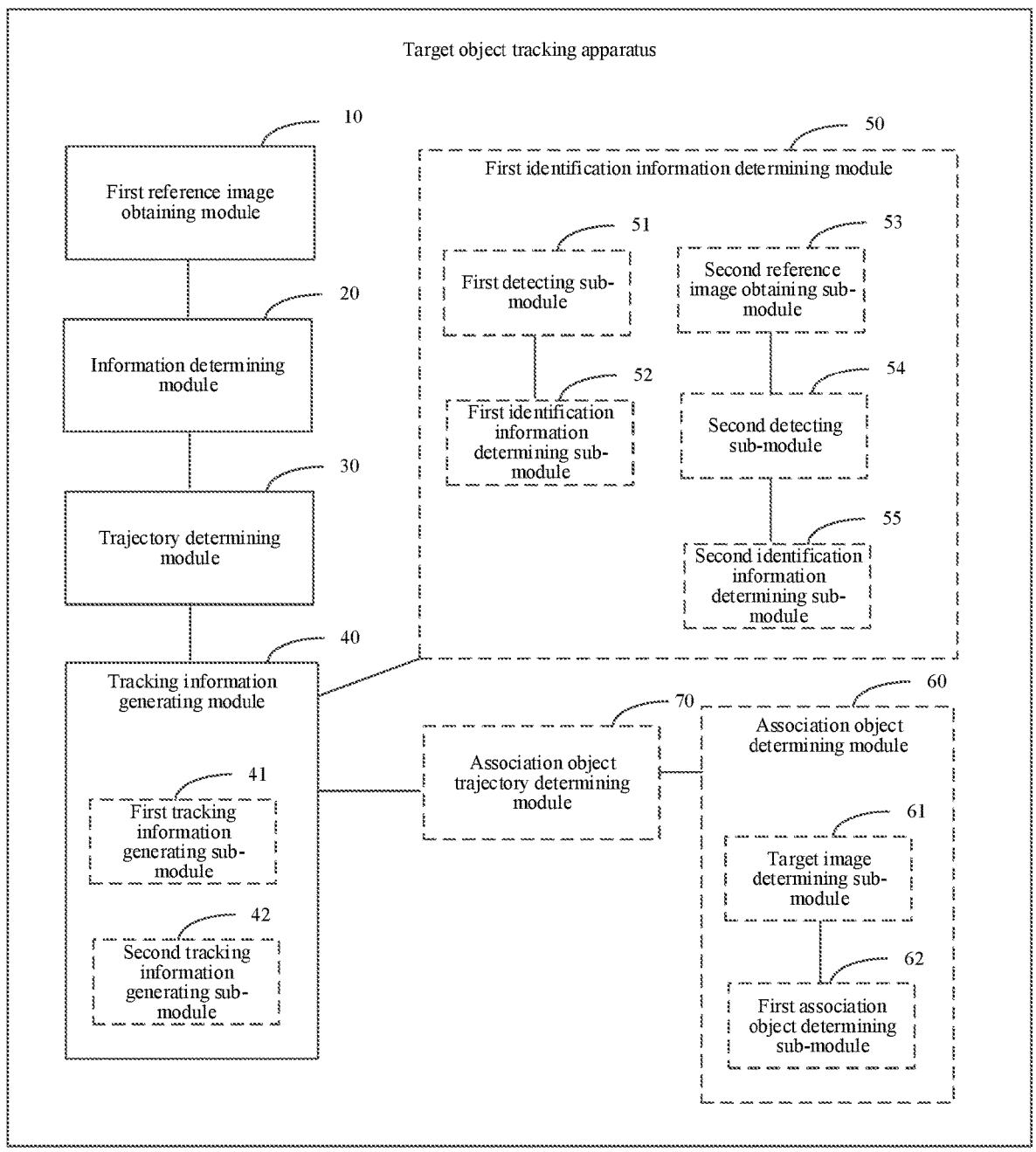
FIG. 8 is a block diagram of a target object tracking apparatus according to an exemplary embodiment.

FIG. 8 is a block diagram of a target object tracking apparatus according to an exemplary embodiment. As shown in FIG. 8, in a possible implementation, the apparatus further includes:
a first identification information determining module 50 configured to determine identification information of the target object.

The tracking information generating module 40 includes:
a first tracking information generating sub-module 41 configured to generate tracking information for tracking the target object according to the trajectory of the target object and the identification information of the target object.

In a possible implementation, the first identification information determining module 50 includes:

a first detecting sub-module 51 configured to detect the target object in an identification image library according to the first reference image of the target object, identification images in the identification image library including identification information of objects; and a first identification information determining sub-module 52 configured to determine the identification information of the target object according to the target object detected in the identification image library.

In a possible implementation, the first identification information determining module 50 further includes:

a second reference image obtaining sub-module 53 configured to, when it is unable to detect the target object in the identification image library according to the first reference image of the target object, determine a second reference image of the target object in the image to be analyzed, the definition of the second reference image being greater than that of the first reference image;

a second detecting sub-module 54 configured to detect the target object in the identification image library according to the second reference image of the target object; and a second identification information determining sub-module 55 configured to determine the identification information of the target object according to the target object detected in the identification image library.

In a possible implementation, the apparatus further includes:

an association object determining module 60 configured to determine an association object of the target object in the image to be analyzed; and an association object trajectory determining module 70 configured to determine a trajectory of the association object.

The tracking information generating module 40 includes:

a second tracking information generating sub-module 42 configured to generate tracking information for tracking the target object according to the trajectory of the target object and the trajectory of the association object.

In a possible implementation, the association object determining module 60 includes:

a target image determining sub-module 61 configured to determine in the image to be analyzed a target image of the target object; and a first association object determining sub-module 62 configured to determine the association object of the target object in the target image.

In a possible implementation, the first association object determining sub-module 62 includes:

an object to be associated determining unit configured to determine an object to be associated of the target object in the target image;

an object to be associated detecting unit configured to detect the object to be associated in the image to be analyzed;

an object to be associated information determining unit configured to determine time information and location information of the object to be associated in the image to be analyzed according to the detected object to be associated;

an object to be associated trajectory determining unit configured to determine a trajectory of the object to be associated according to the time information and the location information of the object to be associated; and a second association object determining unit configured to, when the degree of coincidence between the trajectory of the object to be associated and the trajectory of the target object is greater than a degree-of-coincidence threshold, determine the object to be associated as the association object of the target object.

In some embodiments, the functions provided by or the modules included in the apparatuses provided by the embodiments of the present disclosure may be used to implement the methods described in the foregoing method embodiments. For specific implementations, reference may be made to the description in the method embodiments above. For the purpose of brevity, details are not described herein again.

The embodiments of the present disclosure further provide an electronic device, including: a processor; and a memory configured to store processor-executable instructions, wherein the processor executes the target object tracking method by directly or indirectly calling the executable instructions.

The embodiments of the present disclosure further provide a computer-readable storage medium, having computer program instructions stored thereon, where when the computer program instructions are executed by a processor, the target object tracking method is implemented. The computer-readable storage medium may be a nonvolatile computer-readable storage medium or a volatile computer-readable storage medium.

The embodiments of the present disclosure also provide a computer program, including a computer-readable code, where when the computer-readable code runs in an electronic device, a processor in the electronic device executes the target object tracking method.

Figure 9:
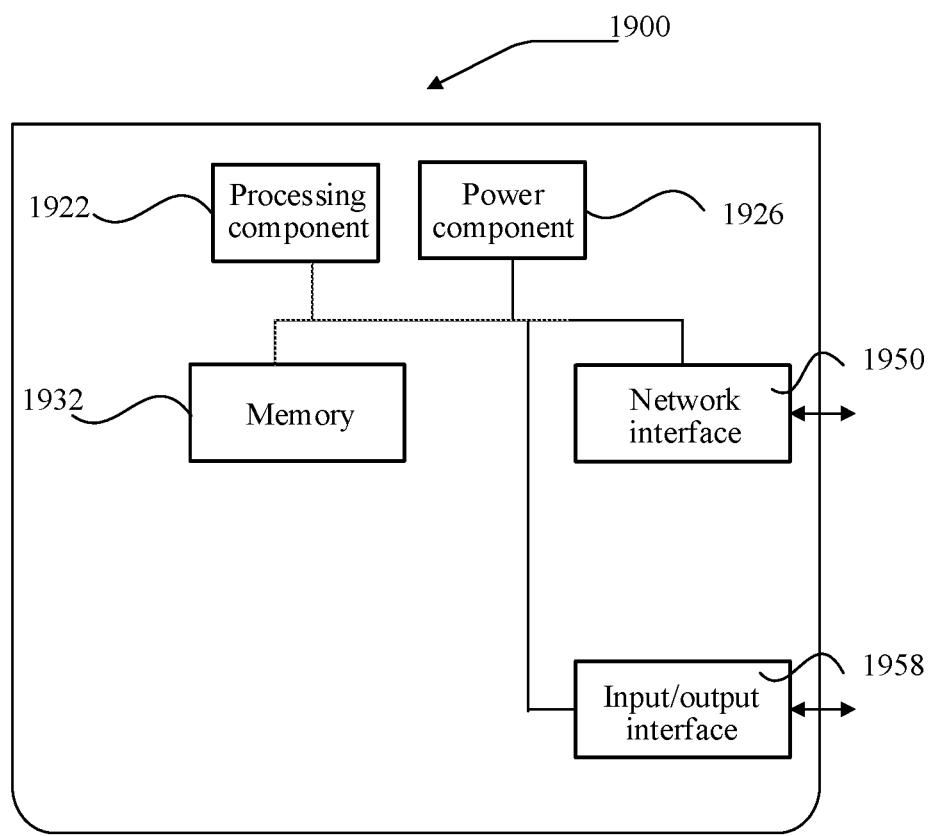
FIG. 9 is a block diagram of an electronic device according to an exemplary embodiment.

FIG. 9 is a block diagram of an electronic device according to an exemplary embodiment. For example, the electronic device may be provided as a terminal, a server, or other forms of devices. For example, the electronic device includes a target object tracking apparatus 1900. Referring to FIG. 9, the device 1900 includes a processing component 1922 which further includes one or more processors, and a memory resource represented by a memory 1932 and configured to store instructions executable by the processing component 1922, for example, an application program. The application program stored in the memory 1932 may include one or more modules, each of which corresponds to a set of instructions. Further, the processing component 1922 may be configured to execute instructions so as to execute the above methods.

The device 1900 may further include a power supply component 1926 configured to execute power management of the device 1900, a wired or wireless network interface 1950 configured to connect the device 1900 to the network, and an input/output (I/O) interface 1958. The device 1900 may be operated based on an operating system stored in the memory 1932, such as Windows Server™, Mac OS X™, Unix™, Linux™, FreeBSD™ or the like. In an exemplary embodiment, a computer-readable storage medium is further provided, for example, a memory 1932 including computer program instructions, which can be executed by the processing component 1922 of the device 1900 to implement the method above.

The present disclosure may be a system, a method, and/or a computer program product. The computer program product may include a computer-readable storage medium, on which computer-readable program instructions used by the processor to implement various aspects of the present disclosure are stored.

The computer-readable storage medium may be a tangible device that can maintain and store instructions used by an instruction execution device. For example, the computer-readable storage medium may be, but not limited to, an electrical storage device, a magnetic storage device, an optical storage device, an electromagnetic storage device, a semiconductor storage device, or any appropriate combination thereof. More specific examples (a non-exhaustive list) of the computer-readable storage medium include a portable computer disk, a hard disk, a Random Access Memory (RAM), a Read-Only Memory (ROM), an Erasable Programmable Read-Only Memory (EPROM or flash memory), a Static Random Access Memory (SRAM), a portable Compact Disc Read-Only Memory (CD-ROM), a Digital Versatile Disk (DVD), a memory stick, a floppy disk, a mechanical coding device such as a punched card storing an instruction or a protrusion structure in a groove, and any appropriate combination thereof. The computer-readable storage medium used here is not interpreted as an instantaneous signal such as a radio wave or other freely propagated electromagnetic wave, an electromagnetic wave propagated by a waveguide or other transmission media (for example, an optical pulse transmitted by an optical fiber cable), or an electrical signal transmitted by a wire.

The computer-readable program instruction described here is downloaded from a computer-readable storage medium to each computing/processing device, or downloaded to an external computer or an external storage device via a network, such as the Internet, a local area network, a wide area network, and/or a wireless network. The network may include a copper transmission cable, optical fiber transmission, wireless transmission, a router, a firewall, a switch, a gateway computer, and/or an edge server. A network adapter card or a network interface in each computing/processing device receives the computer-readable program instruction from the network, and forwards the computer-readable program instruction, so that the computer-readable program instruction is stored in a computer-readable storage medium in each computing/processing device.

Computer program instructions for executing the operations of the present disclosure are compilation instructions, instruction set architecture (ISA) instructions, machine instructions, machine-related instructions, microcode, firmware instructions, status setting data, or source code or target code written in any combination of one or more programming languages. The programming languages include an object-oriented programming language such as Smalltalk or C++, and a conventional procedural programming language such as the "C" language or a similar programming language. The program readable program instructions can be completely executed on a user computer, partially executed on a user computer, executed as an independent software package, executed partially on a user computer and partially on a remote computer, or completely executed on a remote computer or a server. In the case of a remote computer, the remote computer may be connected to a user computer via any type of network, including a Local Area Network (LAN) or a Wide Area Network (WAN), or may be connected to an external computer (for example, connected via the Internet with the aid of an Internet service provider). In some embodiments, an electronic circuit such as a programmable logic circuit, a Field Programmable Gate Array (FPGA), or a Programmable Logic Array (PLA) is personalized by using status information of the computer-readable program instructions, and the electronic circuit can execute the computer-readable program instructions to implement various aspects of the present disclosure.

Various aspects of the present disclosure are described here with reference to the flowcharts and/or block diagrams of the methods, apparatuses (systems), and computer program products according to the embodiments of the present disclosure. It should be understood that each block in the flowcharts and/or block diagrams and a combination of the blocks in the flowcharts and/or block diagrams can be implemented with the computer-readable program instructions.

These computer-readable program instructions may be provided for a general-purpose computer, a dedicated computer, or a processor of another programmable data processing apparatus to generate a machine, so that when the instructions are executed by the computer or the processors of other programmable data processing apparatuses, an apparatus for implementing a specified function/action in one or more blocks in the flowcharts and/or block diagrams is generated. These computer-readable program instructions may also be stored in a computer-readable storage medium. These instructions cause a computer, a programmable data processing apparatus, and/or other devices to function in a particular manner, such that the computer-readable medium having instructions stored thereon includes an article of manufacture including instructions which implement the aspects of the functions/acts specified in one or more blocks of the flowcharts and/or block diagrams.

The computer-readable program instructions may also be loaded onto a computer, other programmable data processing apparatuses, or other devices, so that a series of operations and steps are executed on the computer, the other programmable apparatuses, or the other devices, thereby generating computer-implemented processes. Therefore, the instructions executed on the computer, the other programmable apparatuses, or the other devices implement the specified functions/actions in the one or more blocks in the flowcharts and/or block diagrams.

The flowcharts and block diagrams in the accompanying drawings show architectures, functions, and operations that may be implemented by the systems, methods, and computer program products in the embodiments of the present disclosure. In this regard, each block in the flowcharts or block diagrams may represent a module, a program segment, or a part of instruction, and the module, the program segment, or the part of instruction includes one or more executable instructions for implementing a specified logical function. In some alternative implementations, functions marked in the block may also occur in an order different from that marked in the accompanying drawings. For example, two consecutive blocks are actually executed substantially in parallel, or are sometimes executed in a reverse order, depending on the involved functions. It should also be noted that each block in the block diagrams and/or flowcharts and a combination of blocks in the block diagrams and/or flowcharts may be implemented by using a dedicated hardware-based system configured to execute specified functions or actions, or may be implemented by using a combination of dedicated hardware and computer instructions.

The embodiments of the present disclosure are described above. The foregoing descriptions are exemplary but not exhaustive, and are not limited to the disclosed embodiments. For a person of ordinary skill in the art, many modifications and variations are all obvious without departing from the scope and spirit of the described embodiments. The terminology used herein was chosen to best explain the principles of the embodiments, the practical application or technical improvement over technologies found in the marketplace, or to enable other persons of ordinary skill in the art to understand the embodiments disclosed herein.

What is claimed is:

1. A target object tracking method, comprising:
   obtaining a first reference image of a target object;
   determining time information and location information of the target object in an image to be analyzed according to the first reference image, the image to be analyzed comprising the time information and the location information;
   determining a trajectory of the target object according to the time information and the location information of the target object;
   generating tracking information for tracking the target object according to the trajectory of the target object;
   determining an association object of the target object in the image to be analyzed; and
   determining a trajectory of the association object,
   wherein generating the tracking information for tracking the target object according to the trajectory of the target object comprises:
      generating the tracking information for tracking the target object according to the trajectory of the target object and the trajectory of the association object.

2. The method according to claim 1, wherein after obtaining the first reference image of the target object, the method further comprises:
   determining identification information of the target object,
   wherein generating the tracking information for tracking the target object according to the trajectory of the target object comprises:
      generating the tracking information for tracking the target object according to the trajectory of the target object and the identification information of the target object.

3. The method according to claim 2, wherein determining the identification information of the target object comprises:
   detecting the target object in an identification image library according to the first reference image of the target object, identification images in the identification image library comprising identification information of objects; and
   determining the identification information of the target object according to the target object detected in the identification image library.

4. The method according to claim 3, wherein determining the identification information of the target object further comprises:
   when it is unable to detect the target object in the identification image library according to the first reference image of the target object, determining a second reference image of the target object in the image to be analyzed, the definition of the second reference image being greater than that of the first reference image;
   detecting the target object in the identification image library according to the second reference image of the target object; and
   determining the identification information of the target object according to the target object detected in the identification image library.

5. The method according to claim 1, wherein determining the association object of the target object in the image to be analyzed comprises:
   determining a target image comprising the target object in the image to be analyzed; and
   determining the association object of the target object in the target image.

6. The method according to claim 5, wherein determining the association object of the target object in the target image comprises:
   determining an object to be associated of the target object in the target image;
   detecting the object to be associated in the image to be analyzed;
   determining time information and location information of the object to be associated in the image to be analyzed according to the object to be associated;
   determining a trajectory of the object to be associated according to the time information and the location information of the object to be associated; and
   when the degree of coincidence between the trajectory of the object to be associated and the trajectory of the target object is greater than a degree-of-coincidence threshold, determining the object to be associated as the association object of the target object.

7. A target object tracking apparatus, comprising:
   a processor; and
   a memory having stored thereon instructions that, when executed by the processor, cause the processor to:
      obtain a first reference image of a target object;
      determine time information and location information of the target object in an image to be analyzed according to the first reference image, the image to be analyzed comprising the time information and the location information;
      determine a trajectory of the target object according to the time information and the location information of the target object;
      generate tracking information for tracking the target object according to the trajectory of the target object;
      determine an association object of the target object in the image to be analyzed; and
      determine a trajectory of the association object,
      wherein generating the tracking information for tracking the target object according to the trajectory of the target object comprises:
         generating the tracking information for tracking the target object according to the trajectory of the target object and the trajectory of the association object.

8. The apparatus according to claim 7, wherein after obtaining the first reference image of the target object, the processor is further caused to:
   determine identification information of the target object,
   wherein generating the tracking information for tracking the target object according to the trajectory of the target object comprises:
      generating the tracking information for tracking the target object according to the trajectory of the target object and the identification information of the target object.

9. The apparatus according to claim 8, wherein determining the identification information of the target object comprises:
   detecting the target object in an identification image library according to the first reference image of the target object, identification images in the identification image library comprising identification information of objects; and
   determining the identification information of the target object according to the target object detected in the identification image library.

10. The apparatus according to claim 9, wherein determining the identification information of the target object further comprises:
when it is unable to detect the target object in the identification image library according to the first reference image of the target object, determining a second reference image of the target object in the image to be analyzed, the definition of the second reference image being greater than that of the first reference image;
detecting the target object in the identification image library according to the second reference image of the target object; and
determining the identification information of the target object according to the target object detected in the identification image library.

11. The apparatus according to claim 7, wherein determining the association object of the target object in the image to be analyzed comprises:
determining a target image comprising the target object in the image to be analyzed; and
determining the association object of the target object in the target image.

12. The apparatus according to claim 11, wherein determining the association object of the target object in the target image comprises:
determining an object to be associated of the target object in the target image;
detecting the object to be associated in the image to be analyzed;
determining time information and location information of the object to be associated in the image to be analyzed according to the object to be associated;
determining a trajectory of the object to be associated according to the time information and the location information of the object to be associated; and
when the degree of coincidence between the trajectory of the object to be associated and the trajectory of the target object is greater than a degree-of-coincidence threshold, determining the object to be associated as the association object of the target object.

13. A non-transitory computer-readable storage medium having computer program instructions stored thereon, wherein when the computer program instructions are executed by a processor, the processor is caused to execute a target object tracking method, comprising:
obtaining a first reference image of a target object;
determining time information and location information of the target object in an image to be analyzed according to the first reference image, the image to be analyzed comprising the time information and the location information;
determining a trajectory of the target object according to the time information and the location information of the target object;
generating tracking information for tracking the target object according to the trajectory of the target object;
determining an association object of the target object in the image to be analyzed; and
determining a trajectory of the association object,
wherein generating the tracking information for tracking the target object according to the trajectory of the target object comprises:
generating the tracking information for tracking the target object according to the trajectory of the target object and the trajectory of the association object.

14. The medium according to claim 13, wherein after obtaining the first reference image of the target object, the target object tracking method further comprises:
determining identification information of the target object,
wherein generating the tracking information for tracking the target object according to the trajectory of the target object comprises:
generating the tracking information for tracking the target object according to the trajectory of the target object and the identification information of the target object.

15. The medium according to claim 14, wherein determining the identification information of the target object comprises:
detecting the target object in an identification image library according to the first reference image of the target object, identification images in the identification image library comprising identification information of objects; and
determining the identification information of the target object according to the target object detected in the identification image library.

16. The medium according to claim 15, wherein determining the identification information of the target object further comprises:
when it is unable to detect the target object in the identification image library according to the first reference image of the target object, determining a second reference image of the target object in the image to be analyzed, the definition of the second reference image being greater than that of the first reference image;
detecting the target object in the identification image library according to the second reference image of the target object; and
determining the identification information of the target object according to the target object detected in the identification image library.

17. The medium according to claim 13, wherein determining the association object of the target object in the image to be analyzed comprises:
determining a target image comprising the target object in the image to be analyzed; and
determining the association object of the target object in the target image.

18. The method according to claim 1, wherein generating the tracking information for tracking the target object according to the trajectory of the target object comprises:
in a case that there is a plenty of time information and location information of the target object in the trajectory of the target object, generating a cross trajectory of the target object and the association object according to the trajectory of the target object and the association object, and generating the tracking information for tracking the target object using the cross trajectory; and
in a case that there is a little time information and location information of the target object in the trajectory of the target object, combining the trajectory of the target object and the trajectory of the association object to generate a combined trajectory, and generating the tracking information for tracking the target object using the combined trajectory.

19. The apparatus according to claim 7, wherein generating the tracking information for tracking the target object according to the trajectory of the target object comprises:
in a case that there is a plenty of time information and location information of the target object in the trajectory of the target object, generating a cross trajectory of the target object and the association object according to the trajectory of the target object and the association object, and generating the tracking information for tracking the target object using the cross trajectory; and in a case that there is a little time information and location information of the target object in the trajectory of the target object, combining the trajectory of the target object and the trajectory of the association object to generate a combined trajectory, and generating the tracking information for tracking the target object using the combined trajectory.

20. The medium according to claim 13, wherein generating the tracking information for tracking the target object according to the trajectory of the target object comprises:

in a case that there is a plenty of time information and location information of the target object in the trajectory of the target object, generating a cross trajectory of the target object and the association object according to the trajectory of the target object and the association object, and generating the tracking information for tracking the target object using the cross trajectory; and in a case that there is a little time information and location information of the target object in the trajectory of the target object, combining the trajectory of the target object and the trajectory of the association object to generate a combined trajectory, and generating the tracking information for tracking the target object using the combined trajectory.

\* \* \* \* \*